United States Patent
Svraka et al.

(10) Patent No.: US 11,933,212 B2
(45) Date of Patent: Mar. 19, 2024

(54) EATS FOR CONVERTING NOX EMISSIONS IN EXHAUST GASES FROM AN ENGINE

(71) Applicant: VOLVO TRUCK CORPORATION, Gothenburg (SE)

(72) Inventors: Irman Svraka, Tranås (SE); Dan Stenqvist, Västra Frölunda (SE); Martin Wilhelmsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/935,685

(22) Filed: Sep. 27, 2022

(65) Prior Publication Data

US 2023/0109112 A1   Apr. 6, 2023

(30) Foreign Application Priority Data

Oct. 4, 2021 (EP) .................................... 21200772

(51) Int. Cl.
  *F01N 3/20* (2006.01)
  *B01D 53/94* (2006.01)

(52) U.S. Cl.
  CPC ....... *F01N 3/2066* (2013.01); *B01D 53/9418* (2013.01); *B01D 53/9431* (2013.01);
  (Continued)

(58) Field of Classification Search
  CPC ............. F01N 3/2066; F01N 2610/02; F01N 2610/10; F01N 2610/1453;
  (Continued)

(56) References Cited

U.S. PATENT DOCUMENTS

| 8,423,221 B2 | 4/2013 | Watanabe |
| 10,590,819 B2 | 3/2020 | Crawford et al. |

(Continued)

FOREIGN PATENT DOCUMENTS

| DE | 102015015794 A1 | 8/2016 |
| DE | 102016216492 A1 | 3/2018 |

(Continued)

OTHER PUBLICATIONS

Extended European Search Report in related European Application No. 21200766.0 dated Mar. 25, 2022 (7 pages).

(Continued)

*Primary Examiner* — Kenneth J Hansen
*Assistant Examiner* — Kelsey L Stanek
(74) *Attorney, Agent, or Firm* — Venable LLP; Jeffri A. Kaminski (57) ABSTRACT

An exhaust aftertreatment system, EATS, for converting NOx emissions in exhaust gases from an engine. The EATS includes a fluid channel for providing a fluid pathway for the exhaust gases; a selective catalytic reduction, SCR, catalyst arranged in the fluid channel, the SCR catalyst being configured to store ammonia; an injector configured to inject a reductant for providing ammonia to the SCR catalyst, the injector being arranged upstream of the SCR catalyst; a fluid flow inducer configured to cause an induced fluid flow in at least a part of the fluid channel when the engine is turned off; and a controlling apparatus configured to precondition the EATS prior to engine start by injecting the reductant into the fluid channel, and transport the reductant into the SCR catalyst by the induced fluid flow to store ammonia in the SCR catalyst.

10 Claims, 3 Drawing Sheets

(52) U.S. Cl.
CPC .... *B01D 53/9495* (2013.01); *B01D 2255/911* (2013.01); *F01N 2610/02* (2013.01); *F01N 2610/10* (2013.01); *F01N 2610/1453* (2013.01)

(58) Field of Classification Search
CPC ............ B01D 53/9418; B01D 53/9431; B01D 53/9495; B01D 2255/911
USPC .......................................................... 60/274
See application file for complete search history.

(56) References Cited

U.S. PATENT DOCUMENTS

| | | | |
|---|---|---|---|
| 10,598,109 | B2 | 3/2020 | Mehta |
| 11,506,136 | B1 * | 11/2022 | Harris ........................ F01N 9/00 |
| 11,519,313 | B1 | 12/2022 | Martz et al. |
| 2012/0247084 | A1 | 10/2012 | Atluri et al. |
| 2018/0291827 | A1 | 10/2018 | Disaro' et al. |
| 2019/0063352 | A1 | 2/2019 | McKay et al. |
| 2020/0072105 | A1 | 3/2020 | Korenaga |
| 2020/0240307 | A1 | 7/2020 | Matsumura |
| 2022/0349328 | A1 | 11/2022 | Cox et al. |
| 2023/0109112 | A1 | 4/2023 | Svraka et al. |

FOREIGN PATENT DOCUMENTS

| | | |
|---|---|---|
| DE | 102017213004 A1 | 1/2019 |
| DE | 102020005209 A1 | 10/2020 |
| DE | 102020100529 A1 | 7/2021 |
| EP | 3375994 A1 | 9/2018 |
| FR | 3100839 A1 | 3/2021 |
| FR | 3102210 A1 | 4/2021 |
| GB | 2576890 A | 3/2020 |

OTHER PUBLICATIONS

Extended European Search Report in corresponding European Application No. 21200772.8 dated Mar. 28, 2022 (6 pages).
U.S. Non Final Office Action dated Apr. 19, 2023 in related U.S. Appl. No. 17/935,671, 17 pages.
Notice of Allowance dated Sep. 8, 2023 in related U.S. Appl. No. 17/935,671, 14 pages.

* cited by examiner

EATS FOR CONVERTING NOX EMISSIONS IN EXHAUST GASES FROM AN ENGINE

TECHNICAL FIELD

The present invention relates to an exhaust aftertreatment system, EATS, for converting NOx emissions in exhaust gases from an engine, and to a method for preconditioning at least a part of an EATS. The invention further relates to a controlling apparatus for a vehicle, to a vehicle, and to a computer program.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes one or more of the following components: a diesel oxidation catalyst, DOC, a diesel particulate filter, DPF, and a selective catalytic reduction SCR catalyst. A reductant, such as urea or an ammonia comprising substance, is typically injected upstream of the SCR catalyst to assist in converting nitrogen oxides, also referred to as NOx, with the aid of a catalyst into diatomic nitrogen, $N_2$, and water, and potentially carbon dioxide $CO_2$ (depending on the choice of the reductant). The cleaned, or at least emission reduced, exhaust gases then leaves the EATS and the vehicle through the tailpipe of the vehicle. Other types of engines causing at least partly similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads, and at cold-start of the engine when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolyse into ammonia. If the temperature is low, e.g. during cold-start of the engine, there is a large risk for creating crystallization and deposits that reduce the effect of the EATS.

Prior to engine start, the EATS may be preconditioned. In some examples, the preconditioning of the EATS is performed by heating a component or sub-system of the EATS in order to increase the temperature thereof to be closer to its operating temperature prior to operation of the EATS to handle exhaust gases from the engine. Such thermal preconditioning of the EATS requires energy. Moreover, as the EATS constitutes a large thermal buffer of the vehicle comprising thermally interconnected components, thermal preconditioning may be performed with a relatively low accuracy, as the supplied heat is dissipated and transferred to other EATS components than the anticipated. Also, if thermal preconditioning is performed too early, i.e. relatively early compared to the engine start, heat losses may reduce the efficiency of the preconditioning. There is thus a need in the industry for an improved preconditioning of the EATS to reduce emissions from the vehicle.

SUMMARY

It is an object of the present invention to at least partly alleviate the shortcomings discussed above in relation to known exhaust aftertreatment systems, and to improve the preconditioning of at least a part of the exhaust aftertreatment system.

According to a first aspect of the present invention, an exhaust aftertreatment system, EATS, for converting NOx emissions in exhaust gases from an engine is provided. The EATS comprising:
- a fluid channel for providing a fluid pathway for the exhaust gases,
- a selective catalytic reduction, SCR, catalyst arranged in the fluid channel, the SCR catalyst being configured to store ammonia,
- an injector configured to inject a reductant for providing ammonia to the SCR catalyst, the injector being arranged upstream of the SCR catalyst,
- a fluid flow inducer configured to cause an induced fluid flow in at least a part of the fluid channel when the engine is turned off,
- a controlling apparatus configured to precondition the EATS prior to engine start by injecting the reductant into the fluid channel, and transport the reductant into the SCR catalyst by the induced fluid flow to store ammonia in the SCR catalyst.

Hereby, the SCR catalyst is preconditioned in an advantageous manner. That is, the SCR catalyst is preconditioned at least with regards to an increased ammonia storage in the SCR catalyst, improving the conversation of NOx emissions in the exhaust gases upon engine start. Typically, NOx emissions related to cold-start emissions are reduced as the SCR catalyst is preconditioned prior to engine start. The cold-start emissions typically comprises undesired compounds (such as NOx, particles, and CO or unburned HC) in the exhaust as a result of a cold-start of the engine, and by preconditioning the EATS as described in the present disclosure, such cold-start emission can be reduced. Thus, cold-start emission can be reduced, and emission reduced exhaust gases can leave the EATS through a tailpipe. Typically, the engine is comprised in a vehicle, and the emission reduced exhaust gases can thus leave the EATS trough the tailpipe of the vehicle.

According to at least one example embodiment, the controlling apparatus is further configured to precondition the EATS to reach a pre-determined level of ammonia storage in the SCR catalyst. By preconditioning the SCR catalyst to a pre-determined level of ammonia storage, the SCR catalyst can be brought closer to its normal operating condition prior to engine start. Thus, upon start of the engine, the SCR catalyst has an ammonia storage closer to its normal operating condition as compared to if the SCR catalyst had not been preconditioned to the pre-determined level of ammonia storage. The pre-determined level of ammonia storage may e.g. be an ammonia storage threshold level. According to at least one example embodiment, the controlling apparatus is configured to determine a current level of ammonia storage in the SCR catalyst, and configured to inject the reductant to meet the ammonia storage threshold level.

According to at least one example embodiment, preconditioning is performed up to 30 minutes prior to engine start. Hereby, a sufficient preconditioning of the EATS as described in the present disclosure can be achieved. For example, preconditioning is performed up to 20 minutes, or up to 10 minutes prior to the engine start. Thus, for example, preconditioning is performed between 0-30 minutes, such as between 0-20 minutes, or between 0-10 minutes prior to the engine start. According to another example, preconditioning is performed between 1 minute and 30 minutes, such as between 1 minute and 20 minutes, or between 1 minute and 10 minutes prior to the engine start.

According to at least one example embodiment, at least said part of the fluid channel being subject to the induced flow by the fluid flow inducer comprises the fluid pathway at least from the injector, or point of reductant injection in the fluid channel achieved by the injector, to the SCR catalyst. Hereby, the induced fluid flow will at least transport the injected reductant from the injector to the SCR catalyst. The fluid flow inducer may be referred to as a mass flow source, or a fluid flow source.

It should be understood that prior to engine start implies that the engine is not running, and thus no exhaust gases from the engine are flowing through the EATS during the preconditioning. Thus, the induced fluid flow is a fluid flow different to the flow of exhaust gases.

According to at least one example embodiment, the injector is configured to inject a liquid reductant for providing ammonia to the SCR catalyst. Thus, the controlling apparatus is configured to precondition the EATS prior to engine start by injecting the liquid reductant into the fluid channel. Hereby, a conventional type of reductant source may easily be injected into the fluid channel, the liquid reductant being e.g. urea. According to at least one example embodiment, the liquid reductant is anhydrous ammonia, aqueous ammonia, aqueous urea or a diesel exhaust fluid comprising ammonia.

According to at least one example embodiment, the injector is configured to inject a gaseous reductant for providing ammonia to the SCR catalyst. Thus, the controlling apparatus is configured to precondition the EATS prior to engine start by injecting the gaseous reductant into the fluid channel. Hereby, transportation of the reductant to the SCR catalyst by the induced fluid flow is facilitated. Uptake or storage of the ammonia in the SCR is also facilitated by using a gaseous reductant and/or less external heat is needed in order to provide the SCR catalyst with reductant in the form of a gas.

According to at least one example embodiment, the injector is configured to inject a solid reductant for providing ammonia to the SCR catalyst. Thus, the controlling apparatus is configured to precondition the EATS prior to engine start by injecting the solid reductant into the fluid channel. Typically, such solid reductant, e.g. in the form of solid crystal elements, must be heated in order for providing ammonia which the SCR catalyst can store.

According to at least one example embodiment, the EATS further comprises a heating arrangement for heating the reductant, wherein the controlling apparatus is configured to heat the reductant by means of the heating arrangement.

Hereby, ammonia storage of the SCR catalyst is improved. For example, if a liquid or a solid reductant is injected into the fluid channel, heating thereof typically results in gasification of the liquid or solid reductant. Gaseous reductant, or gaseous ammonia, is more easily transported into the SCR catalyst by the induced fluid flow and/or the uptake or storage of the ammonia in the SCR is also facilitated by a gaseous reductant or gaseous ammonia. The heating arrangement is preferably arranged upstream, or prior to, the SCR catalyst. Hereby, the supplied heating from the heating arrangement is efficiently used. The heating arrangement is typically configured to provide external heat to the reductant.

According to at least one example embodiment, the heating arrangement is arranged in the fluid channel upstream the injector to heat the induced fluid flow passing the heating arrangement, or the heating arrangement is arranged to heat the reductant prior to the injection of the reductant.

Hereby, at least two different alternative positions of providing heat to the reductant is provided. For example, for embodiments in which the heating arrangement is arranged in the fluid channel upstream the injector, the heating arrangement may comprise a heated member arranged in the fluid channel such that the induced fluid flow is heated by passing the heated member. The heated member may e.g. be a lattice, a grating, a coil or a plate. Thus, the injected reductant will be indirectly heated by the heating arrangement as the heated induced fluid flow heats the injected reductant. Hereby, the injected reductant may be heated to evaporate and hydrolize into ammonia. According to another example, for embodiments in which the heating arrangement is arranged to heat the reductant prior to the injection of the reductant, the heating arrangement may comprise a heated member arranged in contact with the injector, or any reductant dosage container fluidly connected to the injector. Hereby, the reductant may be heated prior to injection thereof into the fluid channel.

According to at least one example embodiment, the heating arrangement comprises an electrical heating element or a burner.

Hereby, at least two different alternatives of heating the reductant is provided. For embodiments in which the heating arrangement comprises an electrical heating element, the heating element is configured to be heated by means of electricity. The electrical heating element may comprise, or be thermally conductively connected to, the previously mentioned heated element. According to at least one example embodiment, the heated element comprises a lattice, a grating, a coil or a plate, configured to be heated by electricity led through the lattice, grating, coil, or plate. The electrical heating element may be of another shape, e.g. in the shape of a flat or curved heating lamella, or comprise a heating element of a different type, e.g. a resistance foam. According to at least one example embodiment, the electrical heating element is a Positive Temperature Coefficient, PTC, based element. According to at least one example embodiment, the electrical heating element is based on induction heating and may be referred to as an induction heating element. For embodiments in which the heating arrangement comprises a burner, the burner may be configured to combust fuel in order to provide heat, and may be thermally conductively connected to the previously mentioned heated element.

According to at least one example embodiment, the fluid flow inducer is a fan or a compressor.

A fan or a compressor may relatively easy be arranged inside the fluid channel for inducing the fluid flow, or may be arranged externally of the fluid channel and fluidly connected to the fluid channel by a connection channel. That is, for the latter, the fan or compressor may be configured to induce a fluid flow in a connection channel, wherein the connection channel is connected to the fluid channel to supply the induced fluid flow into at least said part of the fluid channel. A fan or compressor may be easily and quickly started upon will, and may be easily and quickly shut off. Moreover, the controlling apparatus can be configured to control the operation of the fan or compressor in a straightforward manner. Moreover, the level or volume of the induced fluid flow may easily be varied (increased or decreased) by a fan or compressor.

According to at least one example embodiment, the fluid flow inducer comprises a compressed gas source and a valve configured to release compressed air from the compressed gas source into the fluid channel.

A compressed gas source and a valve are reliable means for providing the induced fluid flow. Moreover, a relatively high level or high volume of the induced fluid flow in the fluid channel may be provided quickly by opening the valve.

According to at least one example embodiment, the fluid flow inducer is arranged upstream of the injector.

Hereby, any injected reductant from the injector may follow, and be transported by, the induced fluid flow. According to at least one example embodiment, the fluid flow inducer is arranged in the fluid channel upstream of the heating arrangement. Thus, the induced fluid flow may be heated by the heating arrangement prior to reaching the point of injection of the reductant. Thus, the fluid flow induced is configured such that the induced fluid flow pass the heating arrangement and the point of injection of the reductant prior to reaching the SCR catalyst. The injector may e.g. be arranged at a pre-determined distance from the heating arrangement to enable the heated induced fluid flow to heat any reductant injected by the injector.

According to at least one example embodiment, the EATS further comprises a secondary heating arrangement for heating the SCR catalyst, wherein the controlling apparatus is further configured to heat the SCR catalyst by means of the secondary heating arrangement.

Thus, the SCR catalyst can be heated separately to the heating arrangement configured to heat the reductant. Hereby, the preconditioning of the EATS may be further improved, as the SCR catalyst can be preconditioned in an advantageous manner. For example, by thermally preconditioning the SCR catalyst, the SCR catalyst can be brought closer to its operating temperature prior to engine start. Moreover, the uptake or storage of the ammonia in the SCR may be facilitated by a thermally preconditioned SCR catalyst.

According to a second aspect of the present invention, a method for preconditioning at least a part of an exhaust aftertreatment system, EATS, configured to convert NOx emissions in exhaust gases from an engine, the EATS comprising a fluid channel for providing a fluid pathway for the exhaust gases and a selective catalytic reduction, SCR, catalyst arranged in the fluid channel, the SCR catalyst being configured to store ammonia, is provided. The method comprises:
  injecting a reductant into the fluid channel, and
  inducing a fluid flow in at least a part of the fluid pathway to transport the reductant into the SCR catalyst to store ammonia in the SCR catalyst.

Effects and features of the second aspect of the invention are largely analogous to those described above in connection with the first aspect of the invention. Embodiments mentioned in relation to the first aspect of the invention are largely compatible with the second aspect of the invention, of which some are exemplified below, typically without repeating any advantageous effects.

According to at least one example embodiment, the preconditioning of the method is performed to reach a pre-determined level of ammonia storage in the SCR catalyst.

According to at least one example embodiment, the EATS comprises an injector configured to inject the reductant for providing ammonia to the SCR catalyst, and a fluid flow inducer configured to cause the induced fluid flow, wherein the fluid flow inducer is arranged upstream of the injector. The injector and the fluid flow inducer and any embodiments thereof were described in the first aspect of the invention.

According to at least one example embodiment, the method further comprises heating the reductant.

According to at least one example embodiment, the EATS comprises a heating arrangement for heating the reductant, the heating arrangement being arranged in the fluid channel upstream the injector and the method comprises heating the reductant by means of heating the induced fluid flow passing the heating arrangement and the injector, or wherein the heating arrangement is arranged to heat the reductant, wherein the method comprises heating the reductant prior injecting the reductant. As described for the first aspect of the invention, for embodiments in which the heating arrangement is arranged in the fluid channel upstream of the injector, the heating arrangement is typically configured to heat the induced fluid flow passing the heating arrangement, wherein the heated induced fluid flow heats the injected reductant.

According to a third aspect of the present invention, a controlling apparatus for a vehicle comprising an exhaust aftertreatment system, EATS, is provided. The controlling apparatus is configured to instruct the EATS of the first aspect of the invention to perform the steps of the method according to the second aspect of the invention.

Thus, the controlling apparatus is configured to perform, or execute, at least some of the corresponding steps described with reference to the method of the second aspect of the invention. According to at least one example embodiment, the controlling apparatus is configured to perform, or execute, the method steps according to any of the embodiments mentioned in relation to the first aspect of the invention by instructing the EATS of the first aspect of the invention. The controlling apparatus may e.g. be, or be comprised in, an electrical control unit (ECU) of the vehicle.

According to a fourth aspect of the present invention, a vehicle is provided. The vehicle comprises an exhaust aftertreatment system, EATS, according to the first aspect of the invention, or a controlling apparatus according to the third aspect of the invention.

According to at least one example embodiment, the vehicle is a hybrid vehicle comprising an electric machine for propelling the vehicle in addition to the engine.

Hereby, the operational time, or power, of the engine (e.g., a diesel engine or a hydrogen engine) can be reduced. Moreover, for at least some vehicle operations, the engine may be shut-off, and the vehicle may be propelled solely by the electric machine. Typically, the vehicle comprises energy storage or transformation devices, such as batteries or fuel cells, for powering the electric machine.

According to a fifth aspect of the present invention, a computer program comprising program code means comprising instructions to cause the EATS of the first aspect of the invention to execute the steps of the method according to the second aspect of the invention, when the program is run on a computer, is provided.

According to a sixth aspect of the present invention, a computer readable medium carrying a computer program comprising program code means comprising instructions to cause the EATS of the first aspect of the invention to execute the steps of the method according to the first aspect of the invention, when the program is run on a computer, is provided.

Effects and features of the third to sixth aspects of the invention are largely analogous to those described above in connection with the first and second aspects of the invention. Embodiments mentioned in relation to the first and second aspects of the invention are largely compatible with the third to sixth aspects of the invention.

The order of the method steps described in the second aspect of the invention and implemented in the some of the other aspects of the invention, is not constrained to that described in the present disclosure. One or several of the steps could switch places or occur in a different order without departing from the scope of the invention. However, according to at least one example embodiment, the method steps are performed in the consecutive order described in the second aspect of the invention.

According to at least one example embodiment, applicable to any one of the first to sixth aspects of the invention, the EATS is configured for converting NOx emissions in the exhaust gases from an engine of a vehicle, e.g. a heavy duty truck. The EATS may be used for cleaning exhaust gases from various types of engines, such as e.g. diesel engines or hydrogen engines. For example, the present EATS may be used to clean exhaust gases by converting NOx emissions from the exhausts of internal combustion engines based on CNG (Compressed Natural Gas), LPG (Liquified Pressurized Gas), DME (DiMethylEther), and/or H2 (Hydrogen).

According to at least one example embodiment, the EATS is configured for converting NOx emissions in the exhaust gases from a hydrogen engine of a vehicle. For such embodiment, the EATS may further comprise a particulate filter configured to filter particles in the exhausts. Such particulate filter is advantageously arranged upstream of the SCR catalyst.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
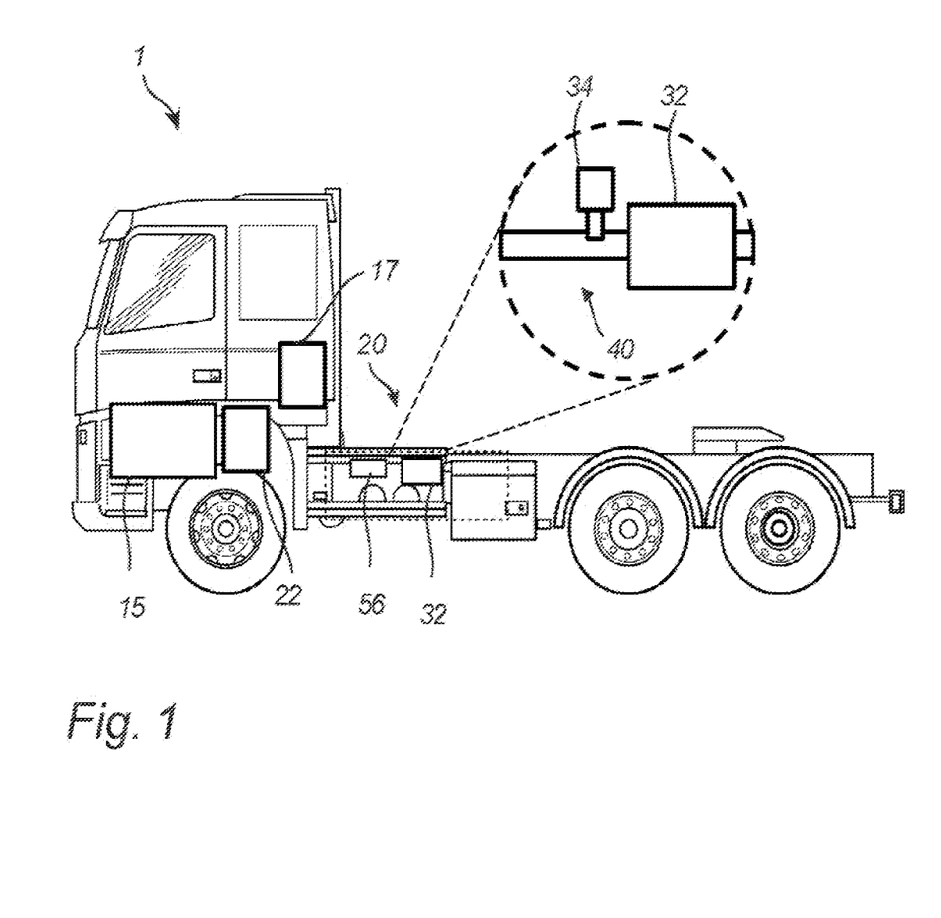
FIG. 1 is a schematic side view of a vehicle comprising an engine, an EATS and a controlling apparatus in accordance with an example embodiment of the invention.

With reference to FIG. 1 a vehicle 1, here embodied as a heavy duty truck 1, is disclosed for which an exhaust aftertreatment system, EATS 20 of a kind disclosed in the present disclosure is advantageous. However, the EATS 20 may as well be implemented in other types of vehicles, such as in busses, light-weight trucks, passenger cars, marine applications etc having similar engine systems. The vehicle 1 of FIG. 1 is a hybrid vehicle 1 comprising an engine 15, being a diesel engine 15, and an electric machine 22. The diesel engine 15 is powered by diesel fuel, typically comprised in a fuel tank (not shown) and the electric machine 22 is powered by electricity supplied from at least one energy storage or transformation device, e.g. a battery or a fuel cell. The diesel engine 15 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 15 alone, the electric machine 22 alone, or by the diesel engine 15 together with the electric machine 22. The engine 15 and the EATS 20 may be commonly referred to as an engine system.

In FIG. 1, the EATS 20 is configured to reduce emissions in exhaust gases from the engine 15. The EATS 20 comprises a fluid channel 40 for providing a fluid pathway for the exhaust gases from the engine 15 and a selective catalytic reduction, SCR, catalyst 32 arranged in the fluid channel 40. The SCR catalyst 32 is arranged and configured to convert nitrogen oxides, also referred to as NOx, with the aid of a catalyst, into diatomic nitrogen (N2), and water (H2O) (and potentially carbon dioxide CO2). An injector 34 configured to inject a reductant, e.g. anhydrous ammonia, aqueous ammonia or a urea solution, is arranged upstream of the SCR catalyst 32. The injected reductant provides ammonia which is absorbed onto the catalyst in the SCR catalyst 32, and which facilitates the conversation of NOx in the SCR catalyst 32. Thus, the SCR catalyst 32 is configured to store ammonia. The EATS 20 further comprises a fluid flow inducer 56 configured to cause an induced fluid flow in at least a part of the fluid channel 40 when the engine is turned off, and a controlling apparatus 17 (control unit 17) configured to precondition the EATS 20 prior to engine start by injecting the reductant into the fluid channel 40 and transport the reductant into the SCR catalyst by the induced fluid flow to store ammonia in the SCR catalyst. Thus, the EATS 20 of FIG. 1 is configured to be preconditioned prior to engine start, which will be further described with reference to FIGS. 2-3.

Figure 2:
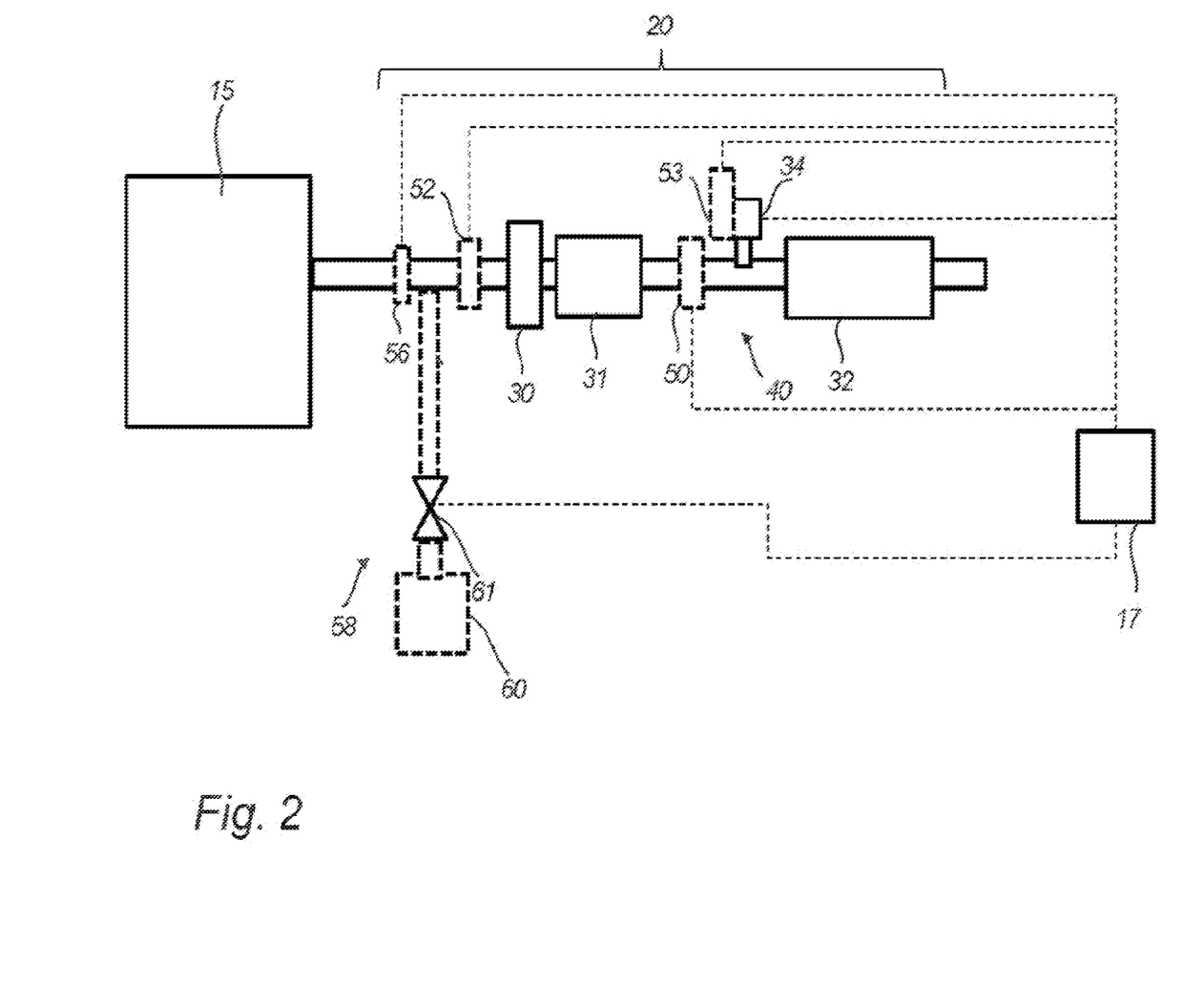
FIG. 2 shows a schematic example of the engine, the EATS and the controlling apparatus of FIG. 1 in a more detailed set-up, applicable to example embodiments of the invention.

FIG. 2 is a schematic view of the EATS 20 of FIG. 1, shown in greater detail and including various optional components and further alternatives. The EATS 20 of FIG. 2 comprises the fluid channel 40, the SCR catalyst 32 and injector 34 as described with reference to FIG. 1. Moreover, the EATS 20 comprises a DOC 30 and a particle filter, which in this embodiment is a DPF 31. The DOC 30 is arranged upstream of the DPF 31 and is configured to convert carbon monoxide and hydrocarbons into carbon dioxide. The DPF 31 is arranged upstream of the SCR catalyst 32, and is arranged and configured to remove particles, i.e. diesel particulate matter or soot, from the exhaust gas of the diesel engine 15.

During initial operation of vehicle, e.g. up to a point in time at which the operating temperature of the engine and the EATS have been reached, the emissions (e.g. emissions per travelled distance, or emissions per unit operational time) out of the EATS are typically higher compared to when the operating temperature of the engine and the EATS have been reached. Such emissions are referred to as cold-start emissions and they typically comprises undesired compounds (such as NOx, particles, and CO or unburned HC) in the exhaust out from the EATS as a result of the cold-start of the engine. In order to avoid, or at least reduce, such cold-start emissions, the EATS may be preconditioned prior to engine start. That is, at least a part of the EATS may be prepared in such a way that the emissions during the initial operation of the engine is reduced.

In order to achieve at least one kind of preconditioning of the EATS 20, the EATS 20 of FIG. 2 comprises a fluid flow inducer 56, 58 configured to cause an induced fluid flow in at least a part of the fluid channel 40 when the engine is turned off. In FIG. 2, two different fluid flow inducers 56, 58 are shown, of which only one is needed to achieve said induced fluid flow. As a first option, a first fluid flow inducer 56 is arranged in the fluid channel 40 upstream of the injector 34, and is configured to cause an induced fluid flow at least in a part of the fluid channel 40 downstream of the first fluid flow inducer 56, when the engine 15 is turned off. The first fluid flow inducer 56 may e.g. be a compressor or a fan. As a second option, a second fluid flow inducer 58 comprises a compressed gas source 60 and a valve 61 configured to release compressed air from the compressed gas source 60 into the fluid channel 40. Thus, the second fluid flow inducer 58 is configured to cause an induced fluid flow at least in a part of the fluid channel 40 downstream of valve 61 (or any connecting channel fluidly connecting the valve 61 with the fluid channel 40). Thus, in both the first and second options, the fluid flow inducer 56, 58 is configured to induce a fluid flow upstream of the injector 34, prior to engine start.

The controlling apparatus 17 of the EATS 20 of FIG. 2 is configured to at least control preconditioning of the SCR catalyst 32 by injecting the reductant into the fluid channel 40 by means of the injector 34, and transport the injected reductant into the SCR catalyst 32 by the induced fluid flow by means of the fluid flow inducer 56, 58 to store ammonia in the SCR catalyst 32. Hereby, a desirable preconditioning of the EATS 20 is achieved, reducing undesired NOX emissions originating e.g. from a cold start of the engine 15.

Optionally, the EATS 20 further comprises a heating arrangement 50, 52, 53 for heating the reductant. In FIG. 2, three different heating arrangements 50, 52, 53 are shown, of which only one is needed to achieve said heating of the reductant. In a first alternative, a first heating arrangement 50 is arranged in the fluid channel 40 upstream of the injector 34. As shown in FIG. 2, the first heating arrangement 50 is arranged just upstream the injector 34, e.g. with no other EATS components in between. For example, the fluid flow distance between the first heating arrangement 50 and the injector 34, or point of injection of the reductant into the fluid channel 40, is 0.1 to 1 m. Hereby, the first heating arrangement 50 may heat the induced fluid flow passing the first heating arrangement 50. In a second alternative, which may be used alone or in combination with the first alternative, a second heating arrangement 52 is arranged in the fluid channel 40 upstream of the injector 34. As shown in FIG. 2, the second heating arrangement 52 is arranged just downstream of the fluid flow inducer 56, 58 (or the point of application of the induced fluid flow into the fluid channel 40), e.g. with no other EATS components in between. For example, the fluid flow distance between the second heating arrangement 52 and the fluid flow inducer 56, 58 (or the point of application of the induced fluid flow into the fluid channel 40), is 0.1 to 1 m. Hereby, the second heating arrangement 52 may heat the induced fluid flow passing the second heating arrangement 52. Preferably, the first and/or the second heating arrangement 50, 52 is an electrical heating element. As mentioned previously, the first and the second heating arrangements 50, 52 may be combined to enhance the heating of the induced fluid flow.

In a third alternative, which may be used alone or in combination with the first and/or second alternative, a third heating arrangement 53 is arranged to heat the reductant prior to the injection of the reductant. As shown in FIG. 2, the third heating arrangement 53 is arranged adjacent, or in thermally conductively connection with the injector 34. For example, the third heating arrangement 53 may be in direction contact with the injector 34, or any reductant dosage container fluidly connected to the injector 34. Hereby, the third heating arrangement 53 may heat the reductant directly prior to injection of the same into the fluid channel 40. For example, the reductant may be heated and evaporated prior to injection of the same into the fluid channel 40. The third heating arrangement 53 may be an electrical heating element or a burner. In a burner, combustion of e.g. HC is achieved to produce heat. As mentioned previously, the first, the second and/or the third heating arrangements 50, 52, 53 may be combined to enhance the heating of the reductant.

Each one of the heating arrangements 50, 52, 53 may e.g. comprise a lattice or a grating, or a coil or a plate, configured to be heated by electricity led through the lattice, grating, coil, or plate. At least one of the heating arrangements 50, 52, 53 may be of another shape, e.g. in the shape of a flat or curved heating lamella, or comprise a heating element of a different type, e.g. a resistance foam. At least one of the heating arrangements 50, 52, 53 may be a Positive Temperature Coefficient, PTC, based element, or may be based on induction heating and referred to as an induction heating element.

Correspondently, the controlling apparatus 17 of the EATS 20 of FIG. 2 may be configured to heat the reductant by means of the heating arrangement 50, 52, 53. Thus, the controlling apparatus 17 is configured to initiate operation of the first, second and/or third heating arrangement 50, 52, 53 to heat the reductant, either indirectly (i.e. via the induced fluid flow) as for the first and second heating arrangement 50, 52, or directly as for the third heating arrangement 53. Hereby, a desirable preconditioning of the EATS 20 is achieved, reducing undesired NOX emissions originating e.g. from a cold start of the engine 15.

Figure 3:
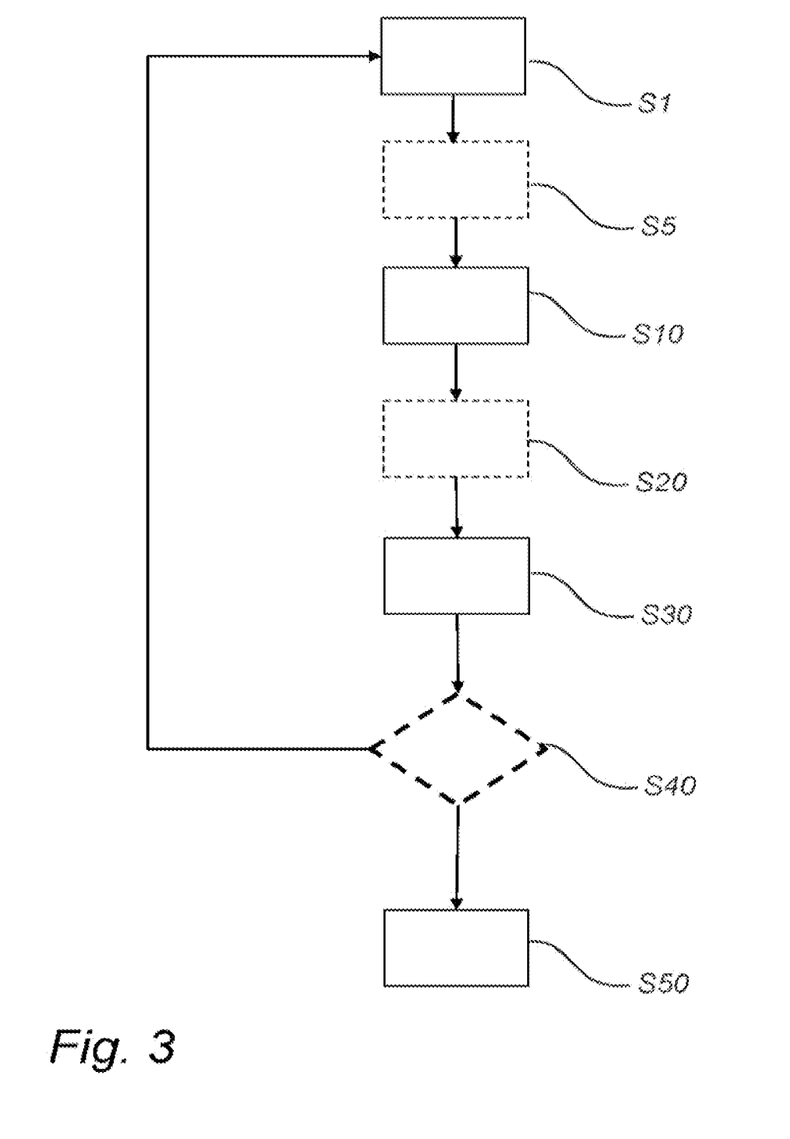
FIG. 3 is a flowchart illustrating the steps of a method in accordance with example embodiments of the invention.

Turning to the flowchart of FIG. 3, schematically illustrating steps of a method for preconditioning at least a part of an EATS, such as the EATS 20 FIGS. 1 and 2. Thus, the EATS is configured to at least convert NOx emission in the exhaust gases from an engine, such as engine 15. The EATS comprises a fluid channel for providing a fluid pathway for the exhaust gases and a selective catalytic reduction, SCR, catalyst arranged in the fluid channel, e.g. corresponding to fluid channel 40 and SCR catalyst 32 of FIGS. 1 and 2. The SCR catalyst is configured to store ammonia.

In a step S1, the preconditioning of at least said part of the EATS is initiated. The initialization of the preconditioning S1 is performed when the engine is turned off, and hence no exhaust gases are flowing through the EATS. The step S1 may e.g. be performed at a time up to 30 minutes prior to engine start.

In a step S10, a reductant is injected into the fluid channel. For example, the reductant may be injected by means of an injector, such as injector 34 described with reference to FIGS. 1 and 2. The reductant provides the ammonia to the SCR catalyst.

In an optional step S20, the injected reductant is heated. Additionally or alternatively, in an optional step S5, the reductant is heated prior to being injected into the fluid channel S10. Thus, the reductant may be heated prior to being injected and/or be heated subsequent to being injected into the fluid channel. For example, the reductant is heated by a heating arrangement, such as the first, second and/or third heating arrangement 50, 52, 53 described with reference to FIGS. 1 and 2.

In a step S30 a fluid flow is induced in at least a part of the fluid pathway to transport the reductant into the SCR catalyst to store ammonia in the SCR catalyst. Thus, the fluid flow is induced during an engine off state in which no exhaust gases are flowing through the EATS. The fluid flow may be induced by a fluid flow inducer, such as the first fluid flow inducer 56 or the second fluid flow inducer 58 described with reference to FIGS. 1 and 2. Thus, the fluid flow inducer is arranged upstream of the injector.

For embodiments in which the reductant is heated, S5, S20, the induced fluid flow transports the heated reductant into the SCR catalyst. For embodiments in which the injected reductant is heated by a heating arrangement, the heating arrangement may be arranged in the fluid channel upstream of the injector, or point of injection of the reductant into the fluid channel. Moreover, the part of the fluid pathway subject to the induced fluid flow typically comprises the heating arrangement and the injector, or point of injection of the reductant into the fluid channel, such that the injected reductant will be heated by means of the induced fluid flow passing the heating arrangement and the injector. Additionally or alternatively, the reductant is heated by a heating arrangement prior to being injected. Thus, heated reductant will be injected into the fluid channel and further transported to the SCR catalyst by the induced fluid flow.

In an optional step S40, it is determined whether a pre-determined level of ammonia storage in the SCR catalyst is reached. In response of determining that the pre-determined level of ammonia storage in the SCR catalyst has been reached, the preconditioning is stopped S50. However, in response of determining that the pre-determined level of ammonia storage in the SCR catalyst has not been reached, the preconditioning restarts by returning to step S1 (or alternatively by the optional step S5 of heating the reductant prior to injection, or injecting the reductant into the fluid channel S10).

By the method described with reference to FIG. 3, at least steps S10 and S30, the EATS is preconditioned at least with regards to an increased ammonia storage in the SCR catalyst, improving the conversation of NOx emissions in the exhaust gases subsequent to engine start.

According to at least one example embodiment, the steps of the method in FIG. 3 are carried out continuously. Thus, for example, a portion of the reductant is heated in step S5 prior to injection into the fluid channel, simultaneously as another portion of heated reductant is injected into the fluid channel in step S10, and another portion of the heated reductant is transported by the (heated) induced fluid flow to the SCR catalyst in step S30. It should be noted that the naming of the steps is not necessarily, but might according to at least one example embodiment, relate to the order in which the steps are carried out. Thus, the order of the steps may be different than that explained here, unless explicitly being dependent on each other.

It is to be understood that the present invention is not limited to the embodiments described above and illustrated in the drawings; rather, the skilled person will recognize that many changes and modifications may be made within the scope of the appended claims. The present invention is not limited to a certain type of engine system and/or EATS. For example, the EATS 20, or a similar one, may be used for cleaning exhaust gases of other engines than diesel engines. For example, the EATS may be used to clean exhaust gases by converting NOx emissions from the exhaust of internal combustion engines using CNG (Compressed Natural Gas), LPG (Liquified Pressurized Gas), DME (DiMethylEther), and/or H2 (Hydrogen) as fuel. Thus, the engine system may comprise another combustion engine than a diesel engine, e.g. a hydrogen engine.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An exhaust aftertreatment system, EATS, for converting NOx emissions in exhaust gases from an engine, the EATS comprising:
   a fluid channel for providing a fluid pathway for the exhaust gases,
   a selective catalytic reduction, SCR, catalyst arranged in the fluid channel, the SCR catalyst being configured to store ammonia,
   an injector configured to inject a reductant for providing ammonia to the SCR catalyst, the injector being arranged upstream of the SCR catalyst,
   a fluid flow inducer configured to cause an induced fluid flow in at least a part of the fluid channel when the engine is turned off,
   a controlling apparatus configured to precondition the EATS prior to engine start by injecting the reductant into the fluid channel, and transport the reductant into the SCR catalyst by the induced fluid flow to store ammonia in the SCR catalyst, the EATS further comprising an electrical heating arrangement for heating the reductant, the controlling apparatus being configured to heat the reductant by the electrical heating arrangement, wherein the electrical heating arrangement is arranged in the fluid channel upstream the injector with no other EATS components in between.

2. The EATS according to claim 1, wherein the fluid flow inducer is a fan or a compressor.

3. The EATS according to claim 1, wherein the fluid flow inducer comprises a compressed gas source and a valve configured to release compressed air from the compressed gas source into the fluid channel.

4. The EATS according to claim 1, wherein the fluid flow inducer is arranged in the fluid channel upstream of the injector.

5. A vehicle comprising the exhaust aftertreatment system, EATS according to claim 1.

6. A method for preconditioning at least a part of an exhaust aftertreatment system, EATS, configured to convert NOx emissions in exhaust gases from an engine, the EATS comprising a fluid channel for providing a fluid pathway for the exhaust gases and a selective catalytic reduction, SCR, catalyst arranged in the fluid channel, the SCR catalyst being configured to store ammonia, the EATS further comprising an electrical heating arrangement for heating the reductant, the electrical heating arrangement being arranged in the fluid channel upstream the injector with no other EATS components in between, the method comprising:
   injecting a reductant into the fluid channel,
   inducing a fluid flow in at least a part of the fluid pathway to transport the reductant into the SCR catalyst to store ammonia in the SCR catalyst, and
   heating the reductant using the electrical heating arrangement.

7. The method according to claim 6, wherein the preconditioning is performed to reach a pre-determined level of ammonia storage in the SCR catalyst.

8. The method according to claim 6, wherein the EATS comprises an injector configured to inject the reductant for providing ammonia to the SCR catalyst, and a fluid flow inducer configured to cause the induced fluid flow, and wherein the fluid flow inducer is arranged in the fluid channel upstream of the injector.

9. A controlling apparatus for a vehicle comprising an exhaust aftertreatment system, EATS, the controlling apparatus being configured to instruct the EATS to perform the steps of the method of claim 6.

10. A non-transitory computer readable medium storing program code comprising instructions to cause an exhaust aftertreatment system, EATS to execute the steps of the method of claim 6, when the computer program code is run on a computer.

* * * * *